United States Patent [19]

Walters

[11] 4,023,386
[45] May 17, 1977

[54] COVER LOCK ASSEMBLY
[75] Inventor: Russell W. Walters, Richmond, Ky.
[73] Assignee: BMR Security Products Corporation, Richmond, Ky.
[22] Filed: July 9, 1975
[21] Appl. No.: 594,301
[52] U.S. Cl. .................................. 70/164; 70/232
[51] Int. Cl.² .................. B65D 55/14; F16B 41/00
[58] Field of Search ............ 70/232, 229, 159, 160, 70/161, 162, 246, 7, 8, DIG. 57, 158, 163, 164, 177, 199, 202, 211

[56] References Cited
UNITED STATES PATENTS

| | | | |
|---|---|---|---|
| 1,747,201 | 2/1930 | White | 70/164 |
| 1,816,563 | 7/1931 | Blackmore | 70/232 |
| 1,989,300 | 1/1935 | Webb | 70/164 |
| 2,825,218 | 3/1958 | O'Brien | 70/8 |
| 3,921,422 | 11/1975 | Walters | 70/97 |

Primary Examiner—Paul R. Gilliam
Assistant Examiner—Kenneth J. Dorner
Attorney, Agent, or Firm—Maleson, Kimmelman and Ratner

[57] ABSTRACT

A cover lock assembly for maintaining a hatch cover securely mounted to a rigid frame including a guard member which passes over at least a portion of the cover and is insertable in a securement device which is mounted to the rigid frame external to but near one end of the hatch cover. A lock housing is releasably attached to an upper surface of the guard member and is movable to a first position covering the securement device. A bar lock mechanism insertable through the lock housing is partially removable in order to permit movement of the lock housing to a second position exposing the securement device which may then be released.

13 Claims, 5 Drawing Figures

COVER LOCK ASSEMBLY

BACKGROUND OF THE INVENTION

1. Field of the Invention

This invention pertains to cover lock assemblies for use in positionally fixing cover members with respect to rigid frames.

2. Prior Art

Cover lock assemblies to protect openings leading to high security areas have been a continuing problem and been the subject of many prior lock system solutions. The problem is increased where the high security area being protected contains equipment which is vulnerable to malicious vandalism. For example, the openings to be protected may be covered by bolt down lid or hatch covers of the type which is removable for inspection.

Specific security problems have been encountered where hatch covers have been used for the purposes of inspecting turbine reduction gear assemblies on board ship. These inspection hatches allow authorized personnel to perform necessary adjustments to the gears with the hatches being leak proof to prevent transmission fluid from flowing out. In some prior instances these covers have been easily opened by unauthorized personnel who have caused extensive damage to the equipment being protected by throwing pieces of metal or other extraneous matter through the openings. Prior lock assemblies have left much to be desired in providing a simple, yet high security system to gaurd such equipment.

SUMMARY OF THE INVENTION

A lock assembly for maintaining a cover positionally fixed with respect to a rigid frame. The lock assembly includes a guard member passing over at least a portion of the cover. Additionally, a securement device is fixedly mounted to the rigid frame and releasably secured to the guard member. An integral lock housing and strike member with the lock housing being pivotally mounted through rotative means to a wall of the strike member. The strike member is rigidly secured to the guard member with the strike member and lock housing being separate from the securement device. The lock housing is rotatable between a first position covering the securement device and strike member and a second position exposing them. A cylindrical bar lock extends through a wall of the lock housing separate from the rotative means for (1) engaging the strike member when the bar lock is in a locked position to constrain the lock housing in the first position and (2) disengaging the strike member when the bar lock is in an unlocked position thereby allowing the lock housing to be rotated to the second position

DETAILED DESCRIPTION

Figure 1:
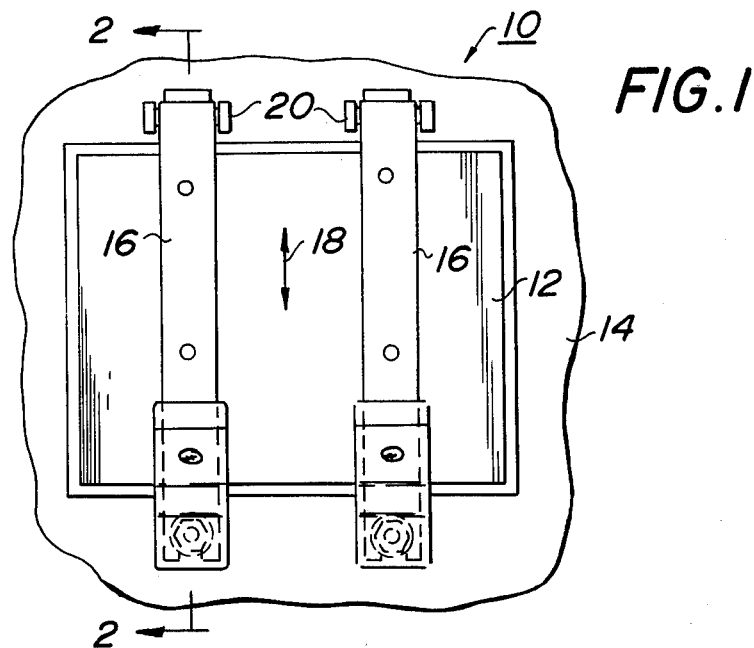
FIG. 1 is a planar view of the lock assembly.

Referring now to FIGS. 1–5, there is shown cover lock assembly 10 for maintaining hatch or cover member 12 positionally fixed with respect to rigid frame or housing 14 and prevent unauthorized removal of cover 12. In particular, assembly 10 has been successfully used as a locking device for hatch covers which guard the transmissions of turbines on shipboard. Cover members 12 may be inspection hatches fixedly secured to turbine transmission housings which must be kept leak proof to prevent fluid from a transmission housing from leaking. Lock assembly 10 is generally used in high security problem areas where the internal turbine transmission apparatus is delicate and is used to prevent unauthorized entry be personnel who may otherwise maliciously throw in pieces of bolts or other metallic parts and cause extensive damage.

Figure 5:
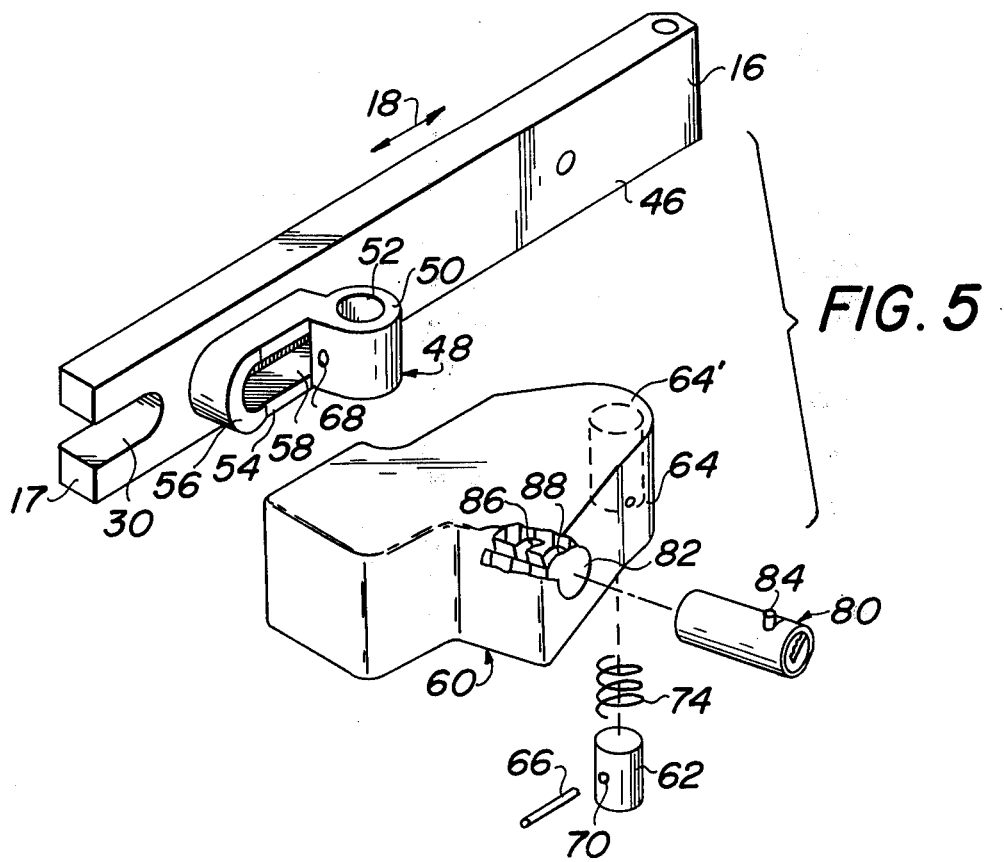

As is seen clearly in FIGS. 1 and 5, cover lock assembly 10 includes guard or shield member 16 which has an extended dimension in a longitudinal direction defined by directional arrow 18. Guard member 16 passes over at least a portion of cover or hatch member 12 and generally blocks the removal of cover 12 from rigid frame 14. Guard 16 is pivotally mounted through pivot pin 20 to column or post member 22, which is in turn rigidly secured or fastened to frame 14. Thus, in essence, guard member 16 is rotatably displaceable with respect to rigid frame 14 about one end thereof.

Further, guard member 16 is secured to hatch or cover member 12 by rivet 24 which passes through opening 26 in guard member 16 and terminates in head 25 having a diameter greater than through opening 26. Rivet member 24 or some like fastening device may be welded or otherwise constrained to hatch 12 by weld 28 in order to maintain fastening or fixed constrainment between cover member 12 and guard member 16. Thus, it is seen that rotational displacement of guard member 16 about pivot pin 20 may result in removal of hatch 12.

Guard member 16 includes longitudinally extended through channel 30 having a predetermined width. Through channel 30 is open ended on guard first end 17 and passes for a predetermined length in longitudinal direction 18 as is shown in FIG. 5. Securement device 32 is fixedly mounted to rigid frame 14 and releasably secured to guard member 16 by insertion within guard member channel 30. Device 32 includes bolt member 34 which is connected to second column 36 through pin member 38 which passes through second column or post 36 and bolt member 34 to maintain them in fixed constrainment each with respect to the other. When pin member 38 is of slightly smaller diameter than the openings which receive it, securement device 32 becomes pivotally mounted to rigid frame 14. As was the case for first column 22, it is understood that second column 36 is secured in rigid fashion to frame 14. Bolt member 34 includes a diameter or width which is slightly less than the width of channel 30 in order that bolt member 34 may be inserted freely within channel 30 as is seen in FIG. 2.

Securement device 32 further includes securement nut 40 which threadedly engages bolt member 34 over threaded portion 44 to provide fixed positional placement of guard member 16 over cover member 12. Washer 42, sandwiched between securement nut 40 and guard member upper surface 46 has a diameter which is substantially greater than the width of channel 30 in order that guard member 16 be maintained in fixed positional alignment. It will be understood that washer 42 may be dispensed with where securement nut 40 includes a diameter greater than the width of channel 30 with the only restriction being that there be a member on the upper surface of guard 16 which will positionally fix the alignment or positioning of guard member 16 with respect to cover member 12 after insertion of bolt member 34 in channel 30.

Guard member 16 further includes strike member 48 rigidly secured or fastened to guard member upper surface 46. Strike 48 includes generally cylindrical portion 50 having strike through opening 52 passing in a direction substantially normal to longitudinal direction 18. Cylindrical portion 50 is connected in one piece formation with longitudinally directed member 54 ending in a raised limit or stop member 56. Longitudinal portion 54 and limit or stop member 56 is generally formed in one piece construction and connected to cylindrical portion 50 of strike member 48 as is shown in FIG. 5. The sidewalls of longitudinal and limit members 54, 56 extend generally above upper surface 46 of guard member 16 to provide strike recess 58. As will be described in following paragraphs, limit member 56 is provided for intersecting a displacement path for lock housing 60 when it is to be moveably displaced from a first position to a second position.

Figure 2:
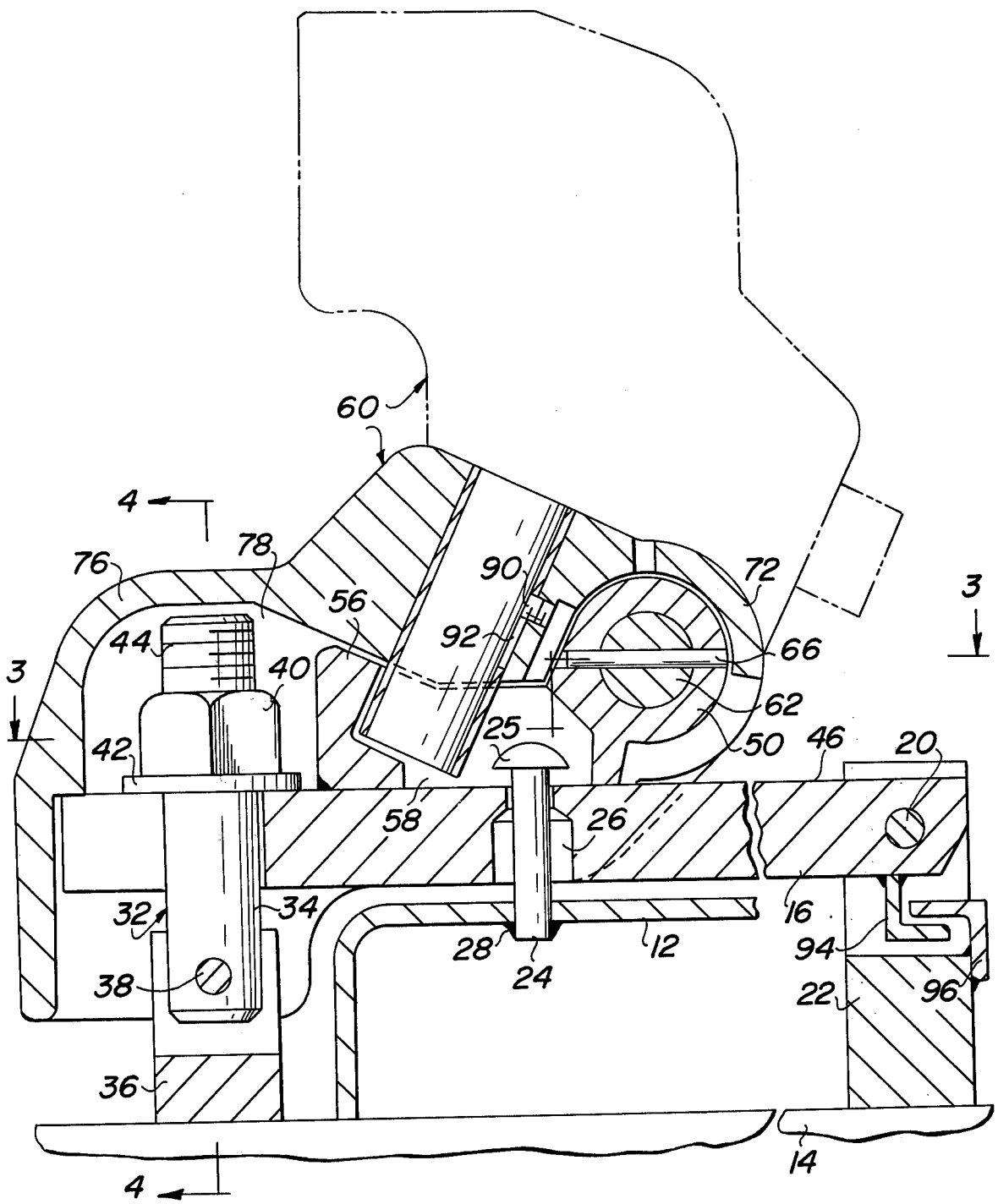
FIG. 2 is a sectional view partially cut away of the lock assembly taken along the section line 2—2 of FIG. 1.
Figure 3:
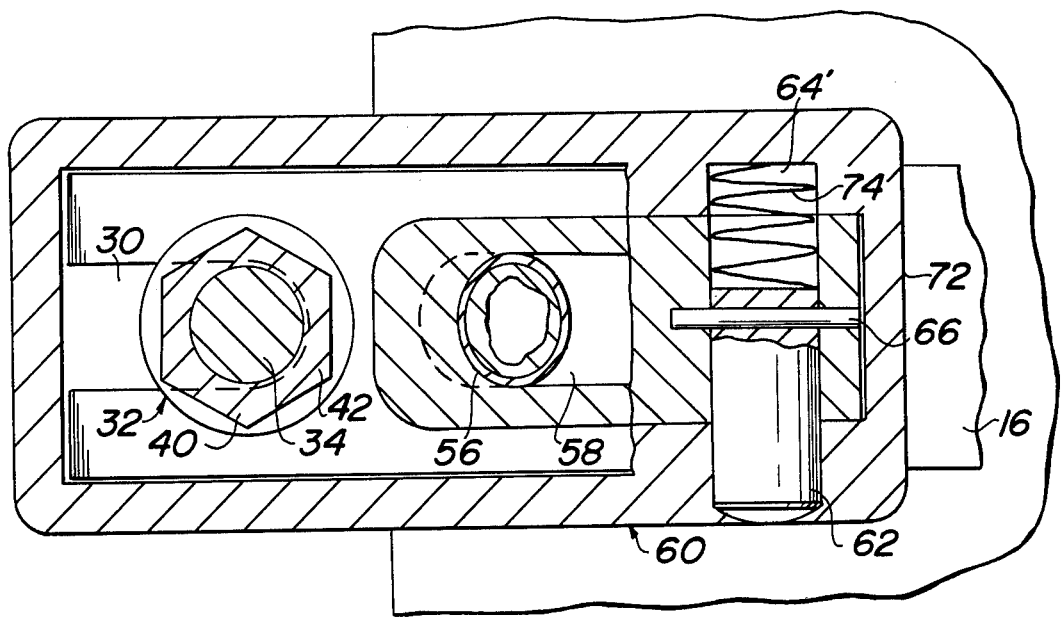
FIG. 3 is a sectional view of the lock housing taken along the section line 3—3 of FIG. 2.
Figure 4:
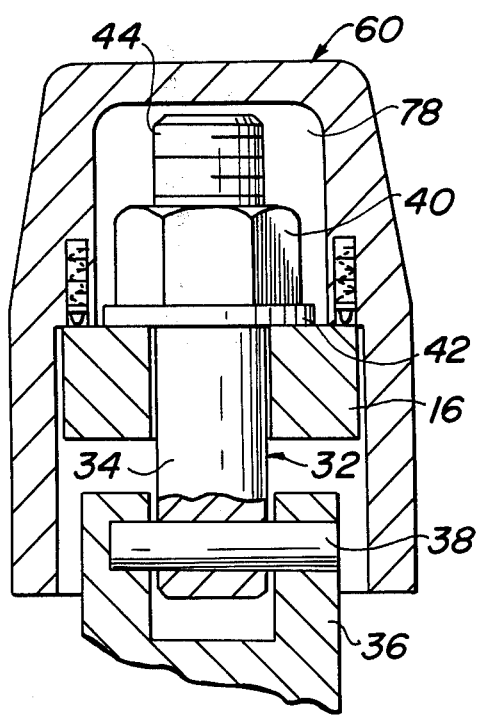
FIG. 4 is a sectional view of the securement device taken along the section line 4—4 of FIG. 2; and, FIG. 5 is an exploded view of the locking assembly showing the guard member, the lock housing, and the bar lock mechanism.

Lock assembly 10 further includes lock housing 60 which is mounted on guard 16 and is movably displaceable to (1) a first position covering securement device 32 as is shown by the darkened lines in FIG. 2, and (2) a second position exposing securement device 32 as is shown in phantom line drawings of FIG. 2. Lock housing 60 is rotatably mounted to strike member 48 and thus also rotatably mounted to guard member 16. Rotational displacement of housing 60 with respect to strike member 48 is accomplished by insertion of housing shaft 62 within strike through opening 52 and housing openings 64 and 64'. Housing openings 64 and 64' are maintained in axial alignment with opening 52 through insertion of housing shaft 62. Openings 64, 64' and 52 have substantially the same diameter and are equal to or slightly greater than the diameter of housing shaft 62 to permit rotation of housing 60 about cylindrical portion 50 of strike member 48. Thus, lock housing 60 is pivotally mounted to strike member 48 through a rotative mechanism which includes shaft 62 secured to an interior wall of member 48.

Roll pin 66 is insertable through interior cylindrical wall opening 68 and shaft insertion passage 70 formed through shaft 62 in order to maintain shaft 62 in fixed position with respect to strike member 48. As is seen in FIG. 2, roll pin 66 passes through shaft 62 and extends partially into the walls of strike cylindrical portion 50 on opposing sides of shaft 62. It is further seen that flap member 72 of housing 60 is contoured around cylindrical portion 50 of strike member 48 and encloses the area where roll pin 66 is located within the walls of strike cylindrical section 50. Roll pin 66 defines a shaft securement mechanism which passes through a wall of member 48 and is covered by a portion of lock housing 60 when housing 60 is in its first position. Thus, roll pin 66 is not exposed to external view and further if drilling were to occur to try to push roll pin 66 from engagement with shaft 62 and the walls of strike cylindrical section 50, it is clear to see from FIG. 2 that roll pin 66 would be pushed or directed internal to lock housing 60. This would have the effect of providing an additional security safeguard whereby it would be extremely difficult to remove roll pin 66 from engaging both housing shaft 62 and strike member 48.

In order to provide a removal mode of operation for housing shaft 62 from engagement with lock housing 60 and strike member 48, there is seen in FIG. 5, spring member 74 which is mounted within shaft opening 64' to bear against one surface of housing shaft 62 and provide a release mechanism for shaft 62. Thus, in operation, spring member 74 is initially inserted into housing opening 64 and bears against one surface or end of housing shaft 62 after insertion of such into aligned passages 64, 64' and 52. Removal of roll pin 66 then permits compression spring 74 to compressively act against housing shaft 62 and provides for easy removal of shaft 62 from releasable contact with strike member 48 and lock housing 60 by providing a release force to bear against one end of shaft 62. It will be clearly seen in FIG. 3, that opening 64' does not pass completely through a sidewall of lock housing 60 as is the case for opening 64. Thus, housing opening 64' provides a cavity within which compression spring 74 may be mounted to bear against one end of housing shaft 62.

As shown, lock housing 60 includes frontal portion or end section 76, which when housing 60 is in the first position covering the securement device 32 extends below pin member 38 and substantially encloses securement device 32. Frontal portion 76 passes over one end of guard member 16 and extends below a lower surface of guard member 16 to provide securing chamber 78 for securement device 32 which essentially partially encloses and shields device 32 from external attack.

Bar lock mechanism 80, similar in construction and operation to that shown and described in my copending patent application Ser. No. 403,460 filed Oct. 4, 1973 is insertable into bar lock opening 82 formed through an upper wall of lock housing 60 into adjacent alignment with limit or stop member 56 as is shown in FIGS. 2 and 5. Locking pin 84 is insertable into either first groove 86 or second groove 88 defining the first position and position for the lock housing operation respectively. As is seen in FIG. 2, when lock pin 84 is inserted or aligned with first groove 86, lock housing 60 is in the first position covering the securement device 32. In this position, bar lock mechanism 80 is extended through the upper wall of lock housing 60 into adjacent alignment with limit member 56 which is secured to the upper surface of guard member 16. In this position as is shown in FIG. 2, limit member 56 prevents rotational displacement of lock housing 60 from the first position to the second position as is herein described.

Movement of bar lock mechanism 80 within lock opening 82 in a limited manner is provided by insertion of set screw 90 into extended tube groove 92 and allows movement of bar lock mechanism 80 throughout the length of groove or channel 92. Thus, bar lock 80 passing through an upper wall of housing 60 is partially constrained to housing 60 and then is provided limited displacement of bar lock 80 with respect to housing 60. It will be noted that set screw 90 passes through and is fastened to an interior wall of lock housing 60. As will be clearly seen in FIG. 2, set screw or constrainment device 90 is enclosed by lock housing 60 when lock housing 60 is in the first position. Thus, set screw 90 is not exposed to external view and cannot easily be removed from bar lock mechanism 80 and lock housing 60 through simple manipulation.

It is to be further noted that guard member 16 includes guard angle iron 94 secured to a lower surface thereof. Column angle iron 96 is mounted to first post or column 22 in mating alignment with guard angle iron 94. Thus, it is clearly seen that where pivot pin 20 is removed from engagement with guard member 16 and first post 22 that angle irons 94 and 96 matingly engage each other when member 16 is moved in longitudinal direction 18. Further, because of the L-shape of members 94 and 96, if a lever or other jimmying mechanism were placed in a manner such that guard member 16 were to be moved in an upward direction, elements 94 and 96 would still obstruct removal of the hatch or cover member 12.

What is claimed is:

1. A lock assembly for maintaining a cover positionally fixed with respect to a rigid frame comprising:
   a guard member passing over at least a portion of said cover,
   securement means mounted to said rigid frame and releasably secured to said guard member,
   an integral lock housing and strike member, said lock housing being pivotally mounted through rotative means to a wall of said strike member, said strike member being rigidly secured to said guard member with said strike member and lock housing being separate from said securement means,
   said lock housing being rotatable between (1) a first position covering said securement means and said strike member and (2) a second position exposing said securement means and said strike member,
   a cylindrical bar lock extendable through a wall of said lock housing separate from said rotative means (1) for engagement with said strike member when said bar lock is in a lock position thereby to constrain said lock housing in said first position, and (2) for disengagement from said strike member when said bar lock means is unlocked and pulled outwardly to an open position thereby allowing said lock housing to be rotated to said second position.

2. The lock assembly as recited in claim 1 where said lock housing is pivotally mounted to said strike member through rotative means including a shaft member, said shaft member being secured to a wall of said strike member.

3. The lock assembly as recited in claim 1 including bar lock constrainment means fastened to an interior wall of said lock housing, said lock housing enclosing said constrainment means when said lock housing is in said first position.

4. The lock assembly as recited in claim 1 where said lock housing encloses an end section of said guard member, said lock housing at least partially extending below a lower surface of said guard member for partially enclosing said securement means.

5. The lock assembly as recited in claim 1 where said securement means is pivotally mounted to said rigid frame through a pivot pin member enclosed by said lock housing when said lock housing is in said first position.

6. The lock assembly as recited in claim 1 where said guard member is pivotally mounted to said rigid frame on one end of said guard member for providing rotative displacement of said guard member with respect to said rigid frame.

7. The lock assembly of claim 1 in which said bar lock means is extendable through said wall of said lock housing in a direction forming an angle with a longitudinal dimension of said securement means.

8. The lock assembly of claim 7 in which said strike member includes a limit member for providing said engagement with said bar lock means so that said bar lock means is an adjacent alignment with said limit member in the lock position.

9. The lock assembly of claim 8 in which said strike member is formed in a one piece configuration having a strike recess for receiving said bar lock means in the lock position with said limit member at one end of said strike recess, said wall of said strike member forming a cylindrical section, a shaft member received in said cylindrical section to pivotally mount said lock housing to said strike member.

10. A lock assembly for maintaining a cover positionally fixed with respect to a rigid frame, comprising:
    a guard member passing over at least a portion of said cover,
    securement means fixedly mounted to said rigid frame and releasably secured to said guard member,
    a strike member secured to an upper surface of said guard member,
    a lock housing rotatively mounted to said strike member and movably displaceable to (1) a first position covering said securement means and (2) a second position exposing said securement means, and
    said lock housing being rotatively mounted to said strike member through rotative means including a shaft member, said shaft member being secured to a wall of said strike member, shaft securement means passing through a wall of said strike member covered by said lock housing when said lock housing is in said first position.

11. The lock assembly as recited in claim 10 where said shaft securement means includes a pin member inserted through said wall of said strike member at least partially into said shaft member for rigidly securing said shaft member to said strike member.

12. A lock assembly for maintaining a cover positionally fixed with respect to a rigid frame, comprising:
    a guard member passing over at least a portion of said cover,
    securement means fixedly mounted to said rigid frame and releasably secured to said guard member,
    a strike member secured to an upper surface of said guard member,
    a lock housing rotatively mounted to said strike member and movably displaceable to (1) a first position covering said securement means and (2) a second position exposing said securement means, and
    said lock housing being rotatively mounted to said strike member through rotative means including a shaft member, said shaft member being secured to a wall of said strike member, shaft release means, a shaft opening formed within said lock housing, said shaft release means mounted within said shaft opening for providing a release force bearing against one end of said shaft member.

13. A lock assembly for maintaining a cover positionally fixed with respect to a rigid frame comprising:

a guard member passing over at least a portion of said cover, securement means fixedly mounted to said guard member, a lock housing mounted on said guard member and movably displaceable to (1) a first position covering said securement means and (2) a second position exposing said securement means, bar lock means passing through a wall of said lock housing and being partially constrained thereto for providing limited displacement of said bar lock means with respect to said lock housing, and bar lock constrainment means fastened to an interior wall of said lock housing, said constrainment means including a set screw member, a channel formed in a predetermined direction within said bar lock means, said constrainment means insertable within said channel, said lock housing enclosing said constrainment means when said lock housing is in said first position.

* * * * *